United States Patent
Turner et al.

(10) Patent No.: US 7,748,120 B2
(45) Date of Patent: Jul. 6, 2010

(54) APPARATUS AND METHOD OF FABRICATING A DOOR

(76) Inventors: Daniel S. Turner, 1319 Meadowood Cir., Poland, OH (US) 44514; Colin S. McConnell, II, 47314 Hillsville Rd., Pulaski, PA (US) 14143; Montgomery L. G. Eby, 68 William Street North, Tavistock, ON (CA) N0B 2R0

( * ) Notice: Subject to any disclaimer, the term of this patent is extended or adjusted under 35 U.S.C. 154(b) by 107 days.

(21) Appl. No.: 12/069,492

(22) Filed: Feb. 11, 2008

(65) Prior Publication Data

US 2008/0254243 A1 Oct. 16, 2008

Related U.S. Application Data

(63) Continuation-in-part of application No. 11/786,919, filed on Apr. 13, 2007, now abandoned.

(51) Int. Cl.
| | |
|---|---|
| B23P 17/00 | (2006.01) |
| B23P 15/12 | (2006.01) |
| B21D 39/03 | (2006.01) |
| E06B 3/964 | (2006.01) |
| E04C 2/54 | (2006.01) |
| B32B 3/00 | (2006.01) |

(52) U.S. Cl. .................. 29/897.31; 29/897; 29/428; 52/204.62; 52/784.1; 52/784.15; 52/784.16; 428/71

(58) Field of Classification Search ............ 29/897, 29/897.31, 428; 52/204.62, 309.9, 455, 784.1, 52/784.15, 784.16; 72/453.13; 428/71
See application file for complete search history.

(56) References Cited

U.S. PATENT DOCUMENTS

| 4,072,548 A | 2/1978 | Gerson et al. |
| 4,327,535 A * | 5/1982 | Governale ............... 52/309.11 |
| 4,659,527 A | 4/1987 | Kataishi et al. |
| 6,389,769 B1 * | 5/2002 | McKinney et al. ......... 52/309.9 |
| 7,430,836 B2 * | 10/2008 | Sibbett ........................ 52/208 |
| 2004/0172906 A1 * | 9/2004 | Ballantyne ................... 52/455 |

* cited by examiner

*Primary Examiner*—David P Bryant
*Assistant Examiner*—Alexander P Taousakis
(74) *Attorney, Agent, or Firm*—Simpson & Simpson, PLLC

(57) ABSTRACT

A method for fabricating a door having a window, the door having a first door skin and a second door skin, the method including the following steps in the order named: forming a first door light opening perimeter having a first plurality of tabs arranged about the first door light opening perimeter, wherein the first door light opening perimeter defines a first door light portion; forming a second door light opening perimeter having a second plurality of tabs arranged about the second door light opening perimeter, wherein the second door light opening perimeter defines a second door light portion; positioning the first door skin on a first press; positioning an insert in aligned registration with the first plurality of tabs; positioning the second door skin over the insert, wherein the second plurality of tabs are in aligned registration with the insert, and the first door light opening perimeter is aligned with the second door light opening perimeter; applying pressure with the first press to secure the first and second door skins with the insert; injecting a foam into a first cavity formed between the first skin outside the first door light portion, the second door skin outside the second door light portion and the insert; and, removing the first and second door light portions.

9 Claims, 17 Drawing Sheets

APPARATUS AND METHOD OF FABRICATING A DOOR

CROSS-REFERENCE TO RELATED APPLICATIONS

This application is a Continuation-in-Part of application Ser. No. 11/786,919, filed on Apr. 13, 2007 now abandoned, which application is incorporated herein by reference.

FIELD OF THE INVENTION

The invention broadly relates to doors, more specifically to lights for doors, and even more particularly to lights for doors constructed from complimentary door skins. The invention also broadly relates to a method of fabricating a door with a door light perimeter defined within the door skins before assembly and arranged to accommodate a window. The invention also relates to an apparatus for carrying out the method of fabrication.

BACKGROUND OF THE INVENTION

Typically, doors constructed of steel or fiberglass comprise two molded door skins forming the front and back surfaces of the door. The door skins are joined together and filled with an expanding foam core which provides insulation, e.g., thermal and sound, and increases structural integrity. Reinforcing and mounting strips, made typically of wood, are sometimes used to provide additional structural and internal integrity when needed.

Each door skin generally has rolled edges to define a perimeter edge used to secure the door skins together when assembled. The door skins are aligned and positioned within a press which forces the perimeter edges together and locks them in place. After the door skins are secured together, synthetic insulation foam is injected between the skins filling the cavity formed therebetween.

For example, contemporary metallic doors are constructed of thin metallic door skins that form the exterior of the door. Door skins are formed from hot dipped galvanized deep drawn steel that is stamped into a desired door shape. The door skins form the exterior of the door and can be joined at the perimeter of the skins by flanges, as previously described, or the door skins can be joined to a frame, e.g., a wood frame, between the skins. Subsequently, a foam core is used to fill the internal cavity left between the door skins, as described supra.

If the door is intended to have a window opening, commonly known to those of ordinary skill in the art as a door light, an additional fabrication step is required. The opening must be cut out to remove the respective door skin areas, and includes the foam core therebetween. The cut out, including both the metal skins and foam, subsequently becomes a waste product that must be disposed of as there is no further use that can be made of the cut out. In fact, waste products of this type are typically considered hazardous waste due to the presence of the foam, and therefore, special waste disposal considerations must be taken into account.

Although the finished door does not include the above described waste material, the finished door cost does include the cost of these materials. Thus, end users must pay more for a door having less material, i.e., after the window opening is formed. In some instances, manufacturers of finished doors cut the window opening in their facility as opposed to having the raw door manufacturer perform this operation. Thus, an uncut door which includes all the additional waste material must be shipped to the finishing manufacturer. The uncut doors weigh more than cut doors and therefore shipping costs are also increased thereby raising the final cost to an end user.

As can be derived from the variety of devices and methods directed at forming doors and in particular forming doors having a light, many means have been contemplated to accomplish the desired end, i.e., constructing a low cost, high quality door with at least one light. Heretofore, tradeoffs between material waste generated during manufacture and cost were required. Thus, there is a long-felt need for a door constructed from door skins having a door light perimeter defined therein prior to filling the door with insulating foam. There is a further long-felt need for a door having a door light and a reduced overall weight. There is also a long-felt need for a door having a door light which generates a reduced amount of waste during assembly. There is yet also a long-felt need for a door having a door light which generates recyclable waste during assembly.

BRIEF SUMMARY OF THE INVENTION

The present invention broadly comprises a method for fabricating a door having a window, the door having a first door skin and a second door skin, the method including the following steps in the order named: a) forming a first door light opening perimeter and a second door light opening perimeter in the first and second door skins, respectively, wherein the first and second door light opening perimeters define a first portion and a second portion, respectively; b) positioning the first door skin on a first press; c) positioning an insert in aligned registration with the first door light opening perimeter of the first door skin; d) positioning the second door skin over the insert, wherein the second door light opening perimeter is in aligned registration with the insert and the first door light opening perimeter; e) applying pressure with the first press to secure the first and second door skins with the insert; f) injecting a foam into a first cavity formed between the first and second door skins and the insert; and, g) removing the first and second portions. In an embodiment, the method further includes the step of: h) inserting the window within a second cavity formed by the insert.

In an embodiment, the insert includes a pair of engagement flanges for aligned registration and engagement with the first and second door skins, each of the pair of engagement flanges includes a groove arranged for receipt of one of the first or second door light opening perimeters therein. In an embodiment, the insert further includes a secondary pair of flanges positioned substantially parallel and between the pair of engagement flanges, the secondary pair of flanges are encapsulated by the foam within the cavity during the injection step. In an embodiment, the secondary flanges are equal in length but shorter in length than either of the engagement flanges. In an embodiment, each of the grooves includes a V-shaped cross-section. In an embodiment, the insert is a molded plastic article. In an embodiment, the insert is a metal article formed by a second press, the insert including first and second bent portions. In an embodiment, the first and second bent portions of the insert are operatively arranged to matingly engage the first and second door light opening perimeters, respectively.

In an embodiment, the present invention broadly comprises a door fabricated according to the method including the following steps in the order named: a) forming a first door light opening perimeter and a second door light opening perimeter in the first and second door skins, respectively, wherein the first and second door light opening perimeters define a first portion and a second portion, respectively; b) positioning the first door skin on a first press; c) positioning an insert in aligned registration with the first door light opening perimeter of the first door skin; d) positioning the second door skin over the insert, wherein the second door light opening perimeter is in aligned registration with the insert and the first door light opening perimeter; e) applying pressure with the first press to secure the first and second door skins with the insert; f) injecting a foam into a first cavity formed between the first and second door skins and the insert; and, g) removing the first and second portions.

In an embodiment, the present invention broadly comprises a method for fabricating a door having a window, the door including a first door skin and a second door skin, the method including the following steps in the order named: a) forming a first door light opening perimeter having a first plurality of tabs arranged about the first door light opening perimeter, wherein the first door light opening perimeter defines a first door light portion; b) forming a second door light opening perimeter having a second plurality of tabs arranged about the second door light opening perimeter, wherein the second door light opening perimeter defines a second door light portion; c) positioning the first door skin on a first press; d) positioning an insert in aligned registration with the first plurality of tabs; e) positioning the second door skin over the insert, wherein the second plurality of tabs are in aligned registration with the insert, and the first door light opening perimeter is aligned with the second door light opening perimeter; f) applying pressure with the first press to secure the first and second door skins with the insert; g) injecting a foam into a first cavity formed between the first door skin outside the first door light portion, the second door skin outside the second door light portion and the insert; and, h) removing the first and second door light portions. In some embodiments, the present invention further includes the step of: i) inserting the window within a second cavity formed by the insert.

In some embodiments, the insert includes a pair of sealing flanges arranged to provide seals about the first and second door light opening perimeters, each of the pair of sealing flanges includes a substantially planar surface arranged for engagement with the first and second door skins. In other embodiments, the insert further includes a connection portion integral to and between the pair of sealing flanges, the connection portion engaged by the foam within the cavity during the injection step. In yet other embodiments, the connection portion is substantially V-shaped. In still yet other embodiments, the pair of sealing flanges and the connection portion are substantially W-shaped. In some embodiments, the insert is a molded plastic article, while in other embodiments, the insert is a metal article formed by a second press, the insert includes a pair of sealing flanges and a connection portion integral to and between the pair of sealing flanges. In some embodiments, the pair of sealing flanges are operatively arranged to provide seals about the first and second door light opening perimeters. The present invention broadly comprises a door fabricated according to the above method.

In an embodiment, the present invention broadly comprises a door including a first door skin having a first door light opening perimeter, the first door light opening perimeter includes a first plurality of tabs arranged about the first door light opening perimeter, a second door skin having a second door light opening perimeter, the second door light opening perimeter includes a second plurality of tabs arranged about the second door light opening perimeter, wherein the first and second door skins are oppositely disposed and arranged to form a first cavity therebetween. The first and second door light opening perimeters are in registered alignment. The present invention door further includes an insert having a pair of sealing flanges and a connection portion integral to and between the pair of sealing flanges, the sealing flanges arranged to provide seals about the first and second door light opening perimeters, each of the pair of sealing flanges includes a substantially planar surface arranged for engagement with the first and second door skins to close the first cavity between the first and second door skins to prevent an infill of a foam into a second cavity during fabrication of the door, wherein the second cavity is defined by the first and second door light opening perimeters and the insert. In some embodiments, the first door light opening perimeter further includes a first plurality of breakaway connectors arranged to permit the removal of a first door light portion of the first door skin within the first door light opening perimeter, and the second door light opening perimeter further includes a second plurality of breakaway connectors arranged to permit the removal of a second door light portion of the second door skin within the second door light opening perimeter.

It is a general object of the present invention to provide a door having a door light at a low cost which is easy to manufacture.

It is another general object of the present invention to minimize the labor and waste created by cutting out a door light from a door after door skins have been assembled and foam insulation has been injected into a cavity formed between the door skins, wherein the waste is a recyclable product.

It is yet another object of the present invention to minimize associated shipping costs for shipping a door from raw door manufacturers to finished door manufacturers by providing a door having a lower weight.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "light" is synonymous with terms such as "window", "opening", "portal", "aperture", "orifice", "porthole", etc., and such terms may be used interchangeably as appearing in the specification and claims. Although any methods, devices or materials similar or equivalent to those described herein can be used in the practice or testing of the invention, the preferred methods, devices, and materials are now described.

Figure 1:
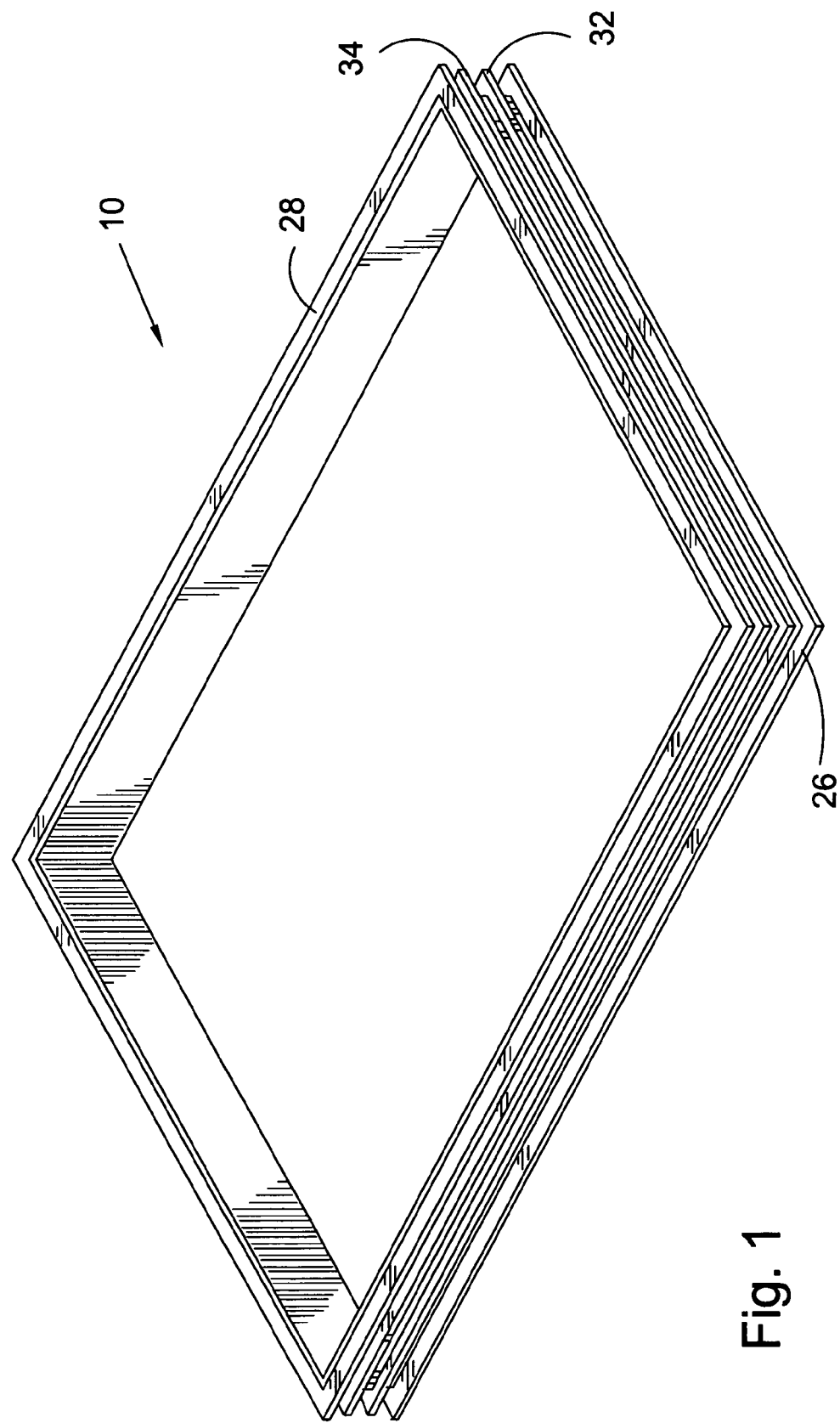
FIG. 1 is a perspective view of an embodiment of a present invention door light insert.
Figure 2:
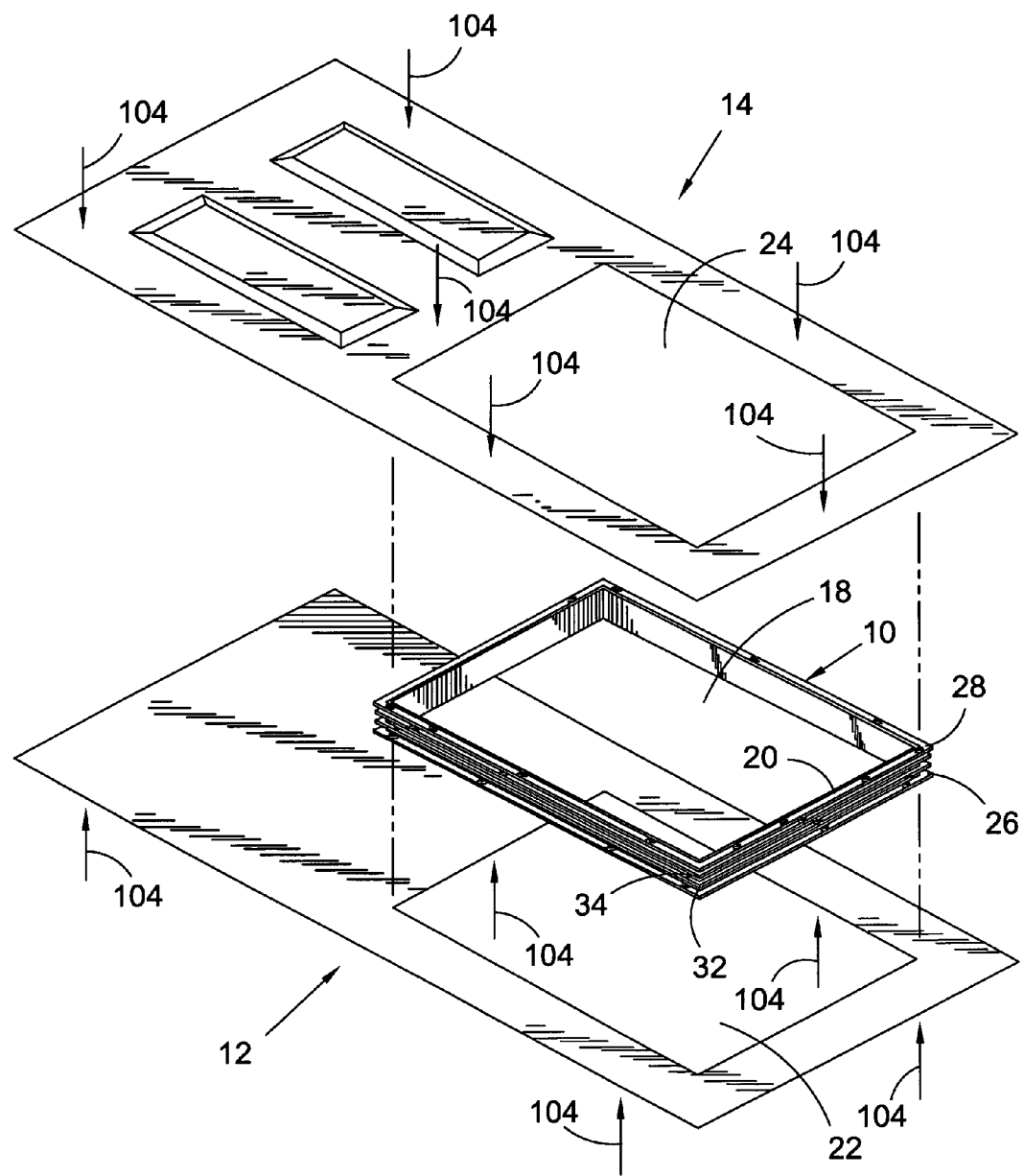
FIG. 2 is a perspective view of the door light insert of FIG. 1 shown during installation between first and second door skins.
Figure 3:
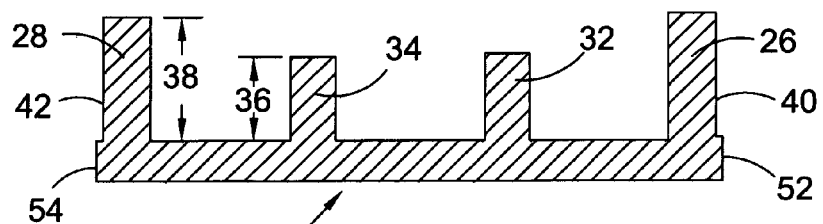
FIG. 3 is a cross sectional view of the door light insert of FIG. 1.
Figure 4:
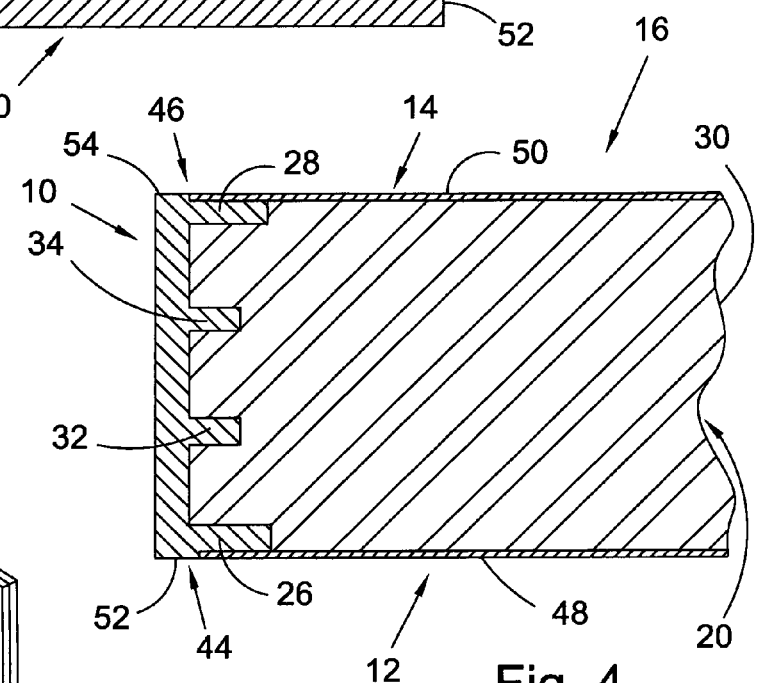
FIG. 4 is a cross sectional view of a completed door including the door light insert of FIG. 1 after fabrication.
Figure 5:
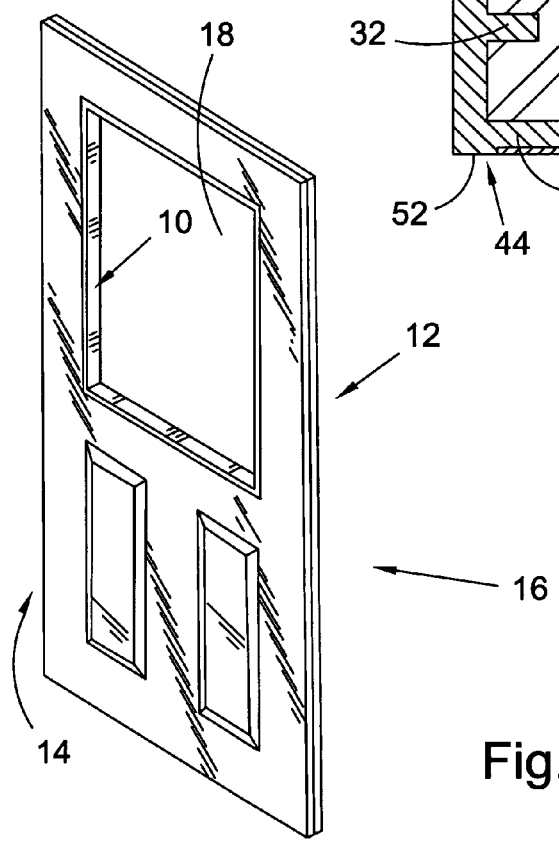
FIG. 5 is a perspective view of a completed door including the door light insert of FIG. 1.

Adverting now to the figures, FIG. 1 shows a perspective view of an embodiment of present invention door light insert 10, while FIG. 2 shows a perspective view of door light insert 10 during installation between first and second door skins 12 and 14, respectively. FIG. 3 shows a cross sectional view of door light insert 10, FIG. 4 shows a cross sectional view of completed door 16 including door light insert 10 after fabrication and FIG. 5 shows a perspective view of completed door 16 including door light insert 10. The following discussion is best understood in view of FIGS. 1 through 5.

Door light insert 10 is used for fabrication of door light 18 in door 16. Door 16 comprises a pair of interlocking and oppositely disposed door skins 12 and 14 which, when assembled, form cavity 20 therebetween. Door skins 12 and 14 further comprise door light openings 22 and 24, respectively. During assembly of door 16, door light opening 22 is registerably aligned with opposing door light opening 24. In the embodiments shown in FIGS. 1 through 5, insert 10 comprises engagement flanges 26 and 28 for engagement with door skins 12 and 14, respectively, within cavity 20. Insert 10 is engageable within door light openings 22 and 24, and closes cavity 20, i.e., the volume formed between door skins 12 and 14, and prevents infill of foam 30 into door light openings 22 and 24, and hence door light 18, during fabrication.

In some embodiments, insert 10 further comprises secondary flanges 32 and 34 positioned substantially parallel to and between engagement flanges 26 and 28. Secondary flanges 32 and 34 are substantially encapsulated in foam 30 within cavity 20 during fabrication of door 16. In some of these embodiments, secondary flanges 32 and 34 are equal in length but shorter in length than either of engagement flanges 26 or 28. In other words, secondary flanges 32 and 34 have first lengths 36, while engagement flanges 26 and 28 have second lengths 38, and first lengths 36 are less than second lengths 38. In yet other embodiments, engagement flanges 26 and 28 each comprise offset engagement surfaces 40 and 42, respectively, so that outer interfaces 44 and 46 between first and second door skins 12 and 14, respectively, and insert 10 are substantially flush. Outer interfaces 44 and 46 are created by the combination of outer surfaces 48 and 50 of door skins 12 and 14, respectively, and steps 52 and 54 of insert 10, respectively. In the embodiments shown in FIGS. 1 through 5, insert 10 is a molded plastic article. However, as one of ordinary skill in the art will recognize, other materials may also be used, e.g., wood, metal, ceramic or polymers, and such variations are within the spirit and scope of the claimed invention. A second embodiment of a present invention door light insert is discuss in detail infra, wherein the insert is constructed from metal.

Figure 6:
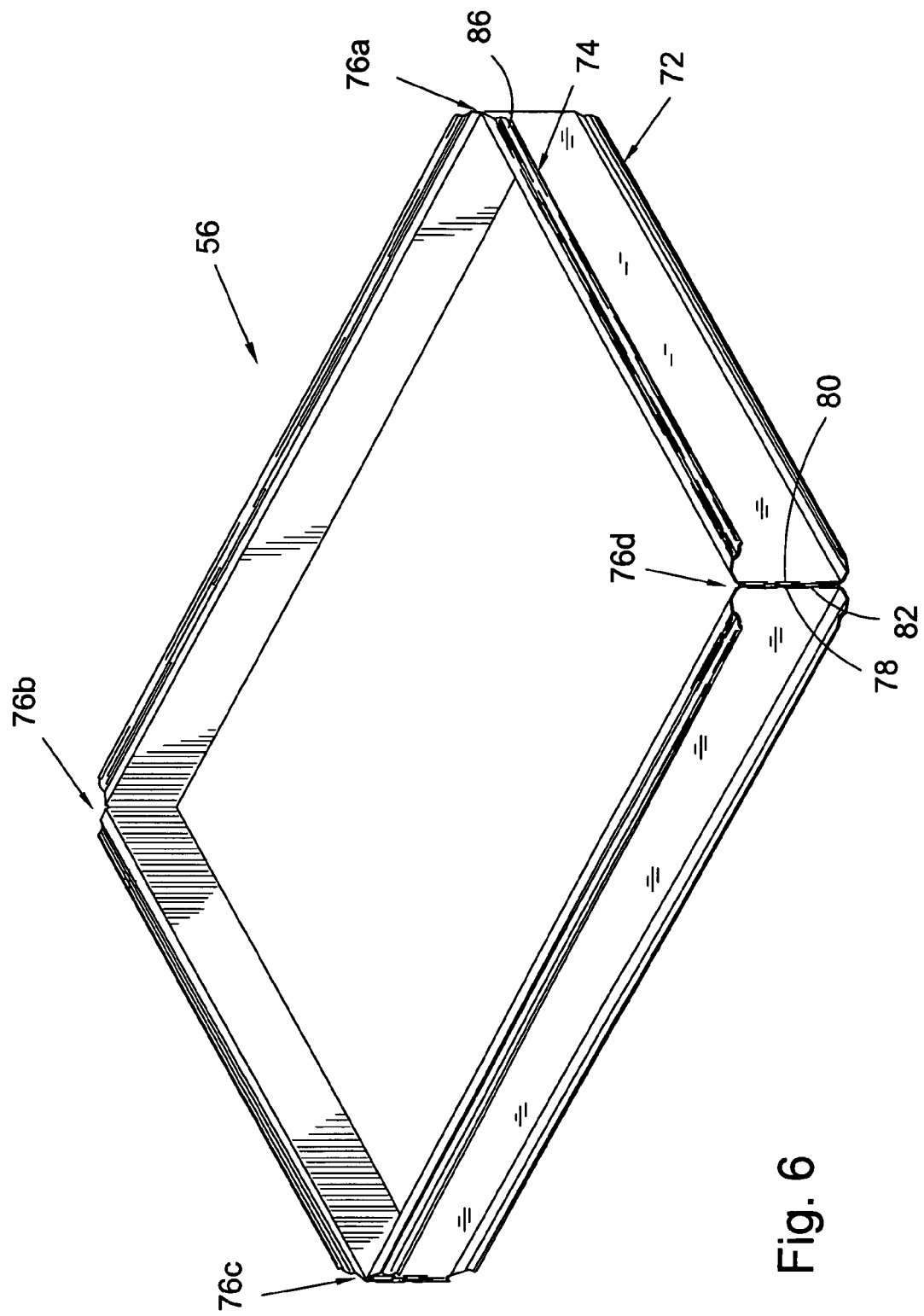
FIG. 6 is a perspective view of an embodiment of a present invention door light insert.
Figure 7:
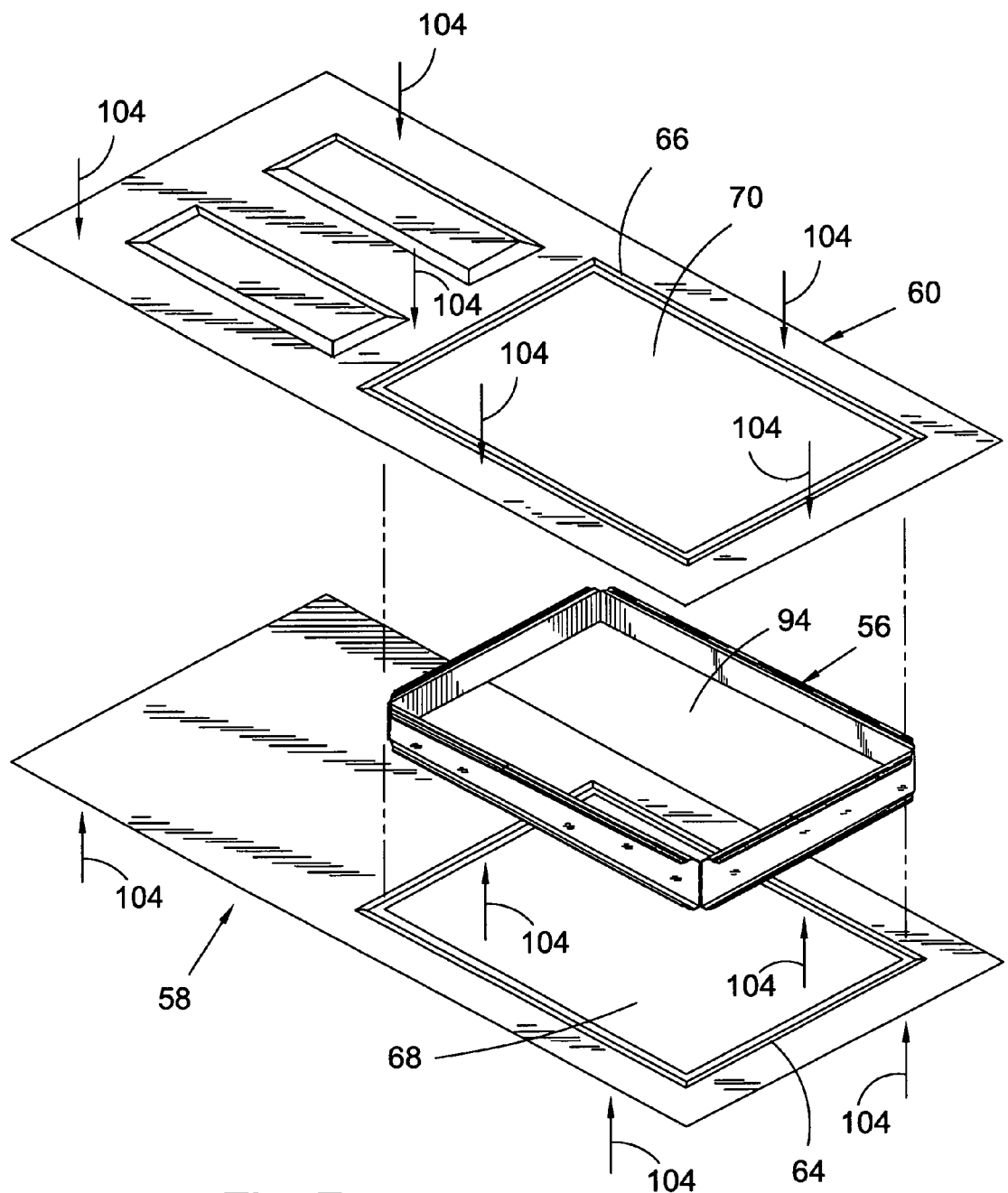
FIG. 7 is a perspective view of the door light insert of FIG. 6 shown during installation between first and second door skins.
Figure 8:
FIG. 8 is a cross sectional view of the door light insert of FIG. 6.
Figure 9:
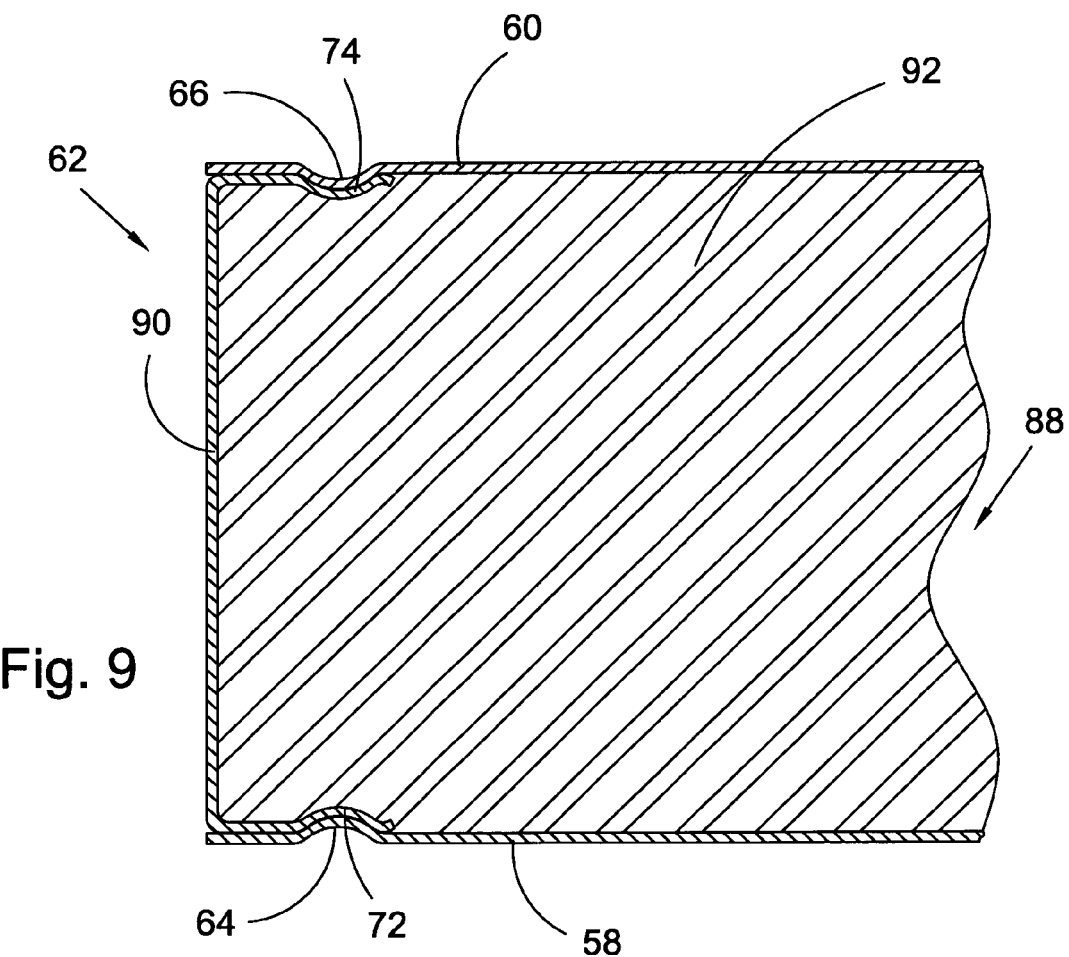
FIG. 9 is a cross sectional view of a completed door including the door light insert of FIG. 6 after fabrication.

FIG. 6 shows a perspective view of an embodiment of the present invention, i.e., door light insert 56, while FIG. 7 shows a perspective view of door light insert 56 during installation between first and second door skins 58 and 60, respectively. FIG. 8 shows a cross sectional view of door light insert 56, while FIG. 9 shows a cross sectional view of completed door 62 including door light insert 56 after fabrication. The following discussion is best understood in view of FIGS. 6 through 9.

In the embodiments shown in FIGS. 6 through 9, door skins 58 and 60 comprise beads 64 and 66, respectively, arranged proximate door light openings 68 and 70, respectively. Although beads 64 and 66 are primarily used for the alignment and securing of insert 56, beads 64 and 66 also provide the added benefit of increasing the rigidity of first and second door skins 58 and 60, respectively. This increased rigidity allows for easier handling of door skins during the assembly process. Although the embodiments shown in FIGS. 6 through 9 comprise stamped metal door skins, one of ordinary skill in the art will recognize that other materials of construction for the door skins are also possible, e.g., molded fiberglass, molded polymer or wood, and such variations are within the spirit and scope of the claimed invention. Additionally, in these embodiments, insert 56 is a metal article formed by a press (not shown), for example, a roll press. Insert 56 comprises first and second bent portions 72 and 74, respectively, operatively arranged to matingly engage beads 64 and 66, respectively. After insert 56 exits the press, the areas where corners are required are cut or notched so that insert 56 may be bent to form the desired shape. For example, corners 76a, 76b, 76c and 76d are cut and subsequently bent to form approximately ninety degree angles. First and second ends 78 and 80, respectively, are joined by means generally known in the art, e.g., welding, overlapping, dovetailing or bonding. In the embodiment shown in FIG. 6, first and second ends 78 and 80, respectively, are joined with weld 82. Although in the embodiments shown in FIGS. 6 through 9, bent portions 72 and 74 are arranged to matingly engage beads 64 and 66, respectively, one of ordinary skill in the art will recognize that other means of interfacing insert 56 and door skins 58 and 60 are also possible, e.g., as described supra relative to insert 10, and such variations are within the spirit and scope of the claimed invention. Similarly, although beads 64 and 66 and bent portions 72 and 74 are shown as generally curved shapes, other shapes are also possible, e.g., V-shaped or square shaped, and these variations are also within the spirit and scope of the claimed invention.

In some embodiments, bonding agents 84 and 86 are deposited on bent portions 72 and 74, respectively, as insert 56 exits the press, or are subsequently deposited as secondary operations after forming insert 56. Bonding agents 84 and 86 may for example be an adhesive, a pressure sensitive adhesive, a glue, an epoxy or a weld. Thus, during assembly, bent portion 72 having bonding agent 84 deposited thereon is pressed against bead 64 of first door skin 58 thereby securing insert 56 to first door skin 58. Subsequently, bead 66 of second door skin 60 is pressed against bent portion 74, having bonding agent 86 deposited thereon, thereby securing second door skin 60 to insert 56. One of ordinary skill in the art recognizes that bonding agents 84 and 86 serve a variety of purposes which include but are not limited to: providing bonding strength to hold door skins 58 and 60 and insert 56 together during assembly and thereafter; and, providing a thermal break within the assembly to reduce heat transfer between door skins 58 and 60 and insert 56. Subsequent to assembling door skins 58 and 60 and insert 56, cavity 88, i.e., the volume formed between first and second door skins 58 and 60, respectively, and wall 90 of insert 56, is filled with foam 92. As can be seen in the figures, in these embodiments, wall 90 prevents any inflow of foam 92 within cavity 94, i.e., the opening for a window.

One of ordinary skill in the art recognizes that although not described above, engagement flanges 26 and 28 of insert 10 may also have a bonding agent deposited thereon for purposes of assembly, and such variations are within the spirit and scope of the claimed invention. Additionally, one of ordinary skill in the art will recognize that all embodiments described herein may also be practiced without the presence of bonding agents, and such variations are also within the spirit and scope of the claimed invention.

Figure 10:
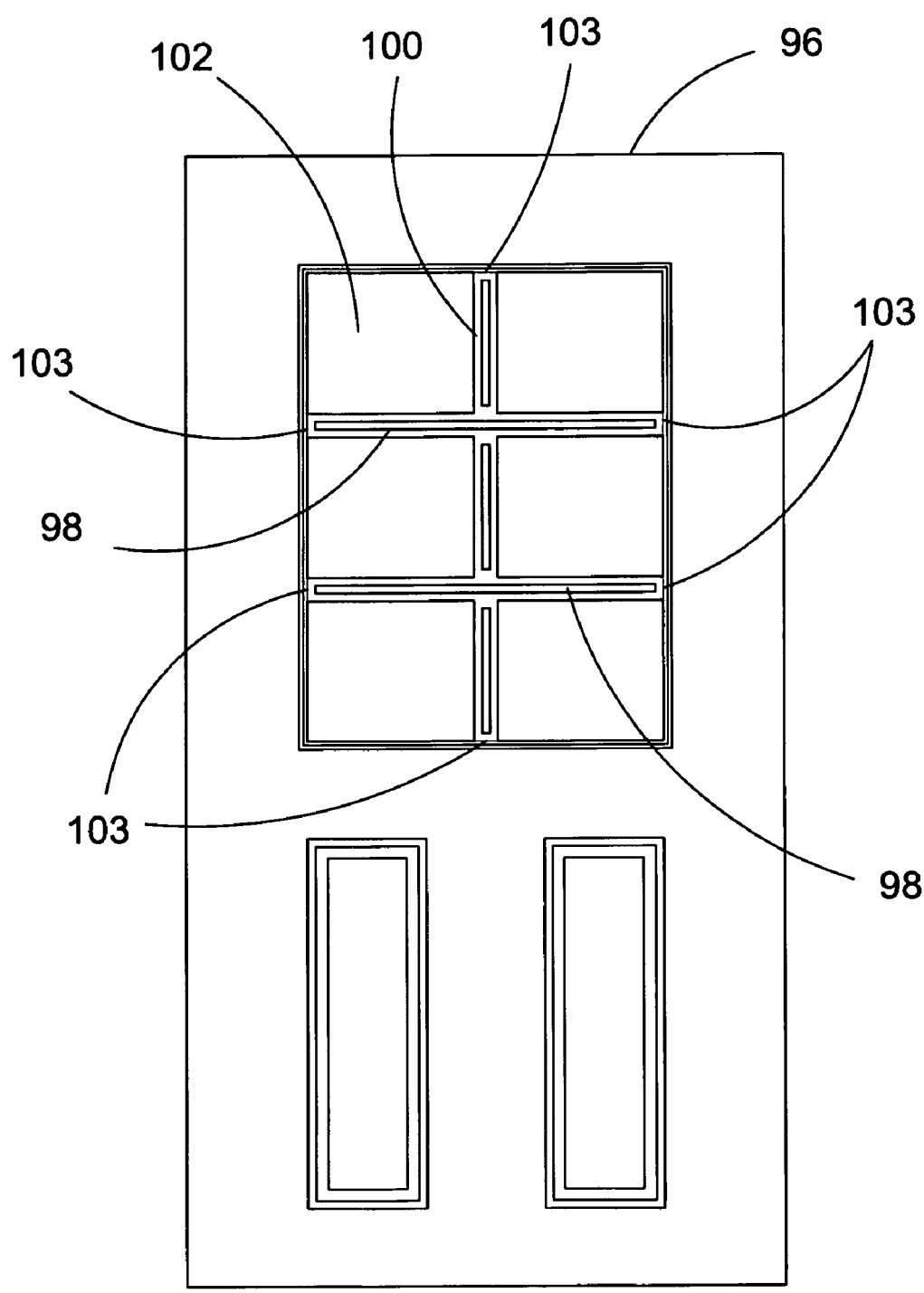
FIG. 10 is a front plan view of a door skin including horizontal and vertical break away strips.

FIG. 10 shows a front plan view of door skin 96 including horizontal and vertical break away strips 98 and 100, respectively. Due to the thickness of the door skins, bending and distortion may occur during the assembly process thereby decreasing the aesthetic quality of the assembled door. Therefore, in some embodiments, door skin 96 includes horizontal and vertical break away strips 98 and 100, respectively, operatively arranged within door light opening 102. Although in the embodiment shown in FIG. 10 door skin 96 includes two horizontal break away strips 98 and one vertical break away strip 100, one of ordinary skill in the art will recognize that other arrangements are also possible, e.g., one horizontal break away strip, one vertical break away strip, one diagonal break away strip, a plurality of horizontal break away strips, a plurality of vertical break away strips, a plurality of diagonal break away strips or combinations thereof, and such variations are within the spirit and scope of the invention as claimed. Subsequent to door assembly, the break away strips may be removed by bending weakened portions 103 until the break away strips separate from the door skin, or alternatively, the break away strips may be left in to provide further structural support during shipping of an assembled door to a manufacturer of finished doors, and in those instances, the break away strips are removed after shipping but prior to the final installation of a window.

The following discussion is best understood in view of FIGS. 1 through 9, and in particular FIGS. 2 and 7. The present invention also broadly comprises a method for fabricating doors, for example doors 16 and 62 having door light insert 10 and 56, respectively. As described supra, door 16 comprises first and second door skins 12 and 14, respectively, having first and second door light openings 22 and 24, respectively, while door 62 comprises first and second door skins 58 and 60, respectively, having first and second door light openings 68 and 70, respectively. A first door skin, e.g., first door skin 12 or 58, is positioned on a press (not shown). Then, an insert, e.g., insert 10 or 56, is positioned in aligned registration with a first door light opening of the first door skin, e.g., first door light opening 22 or 68. Next, a second door skin, e.g., second door skin 14 or 60, is positioned over the insert, wherein a second door light opening, e.g., second door light opening 24 or 70, is in aligned registration with the insert and the first door skin. Then, pressure is applied in the direction of arrows 104 with the press to secure the first and second door skins with the insert. Subesequently, a foam, e.g., foam 30 or 92, is injected into a cavity formed between the first and second door skins and the insert, e.g., cavity 20 or 88.

Depending on the needs and/or requirements of the purchaser of a door assembled by the method described supra, in some embodiments, the method further comprises inserting a window (not shown) within a second cavity formed by the insert, e.g., cavity 18 or 94.

Figure 11:
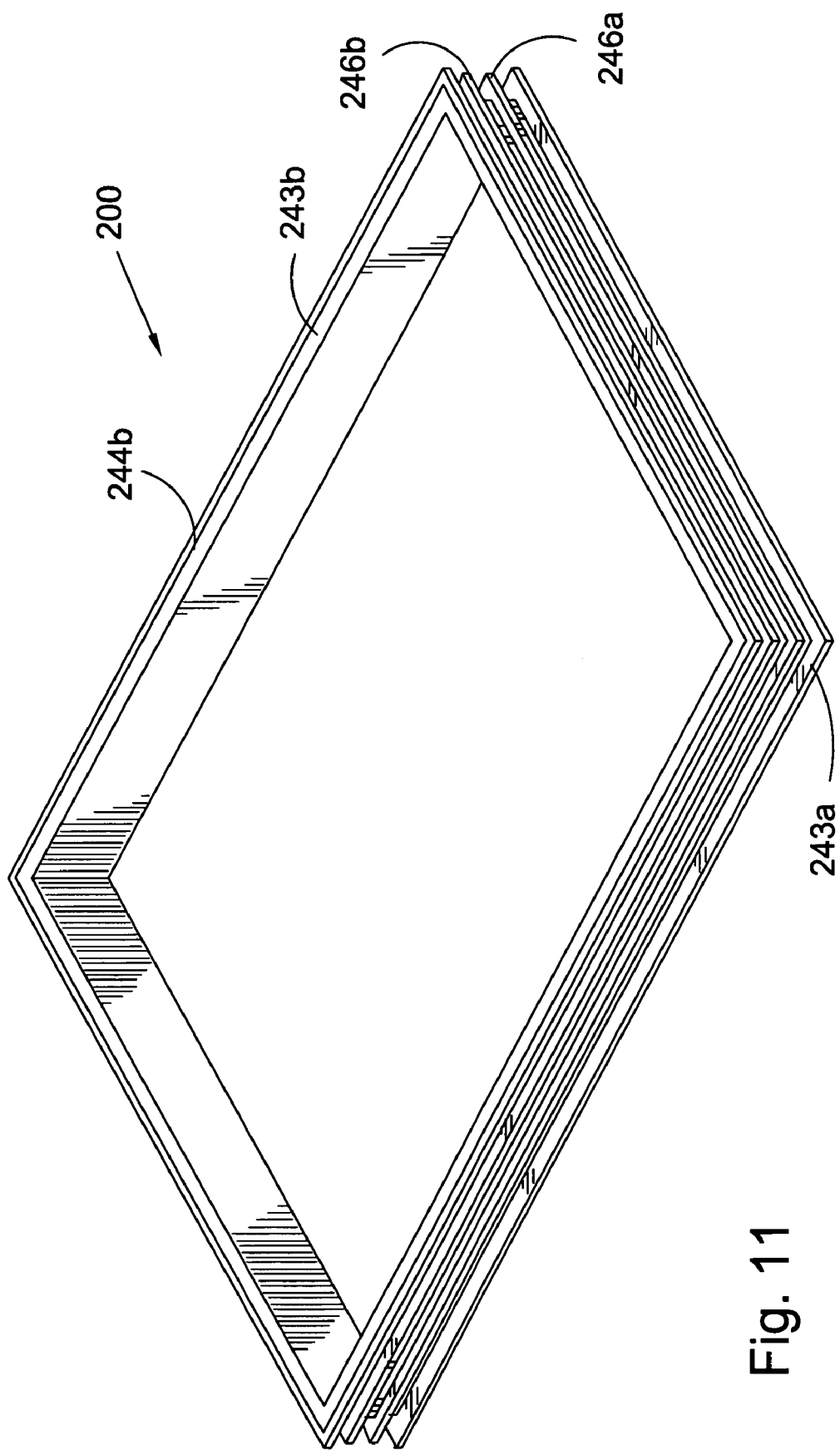
FIG. 11 is a perspective view of an embodiment of a present invention door light insert.
Figure 12:
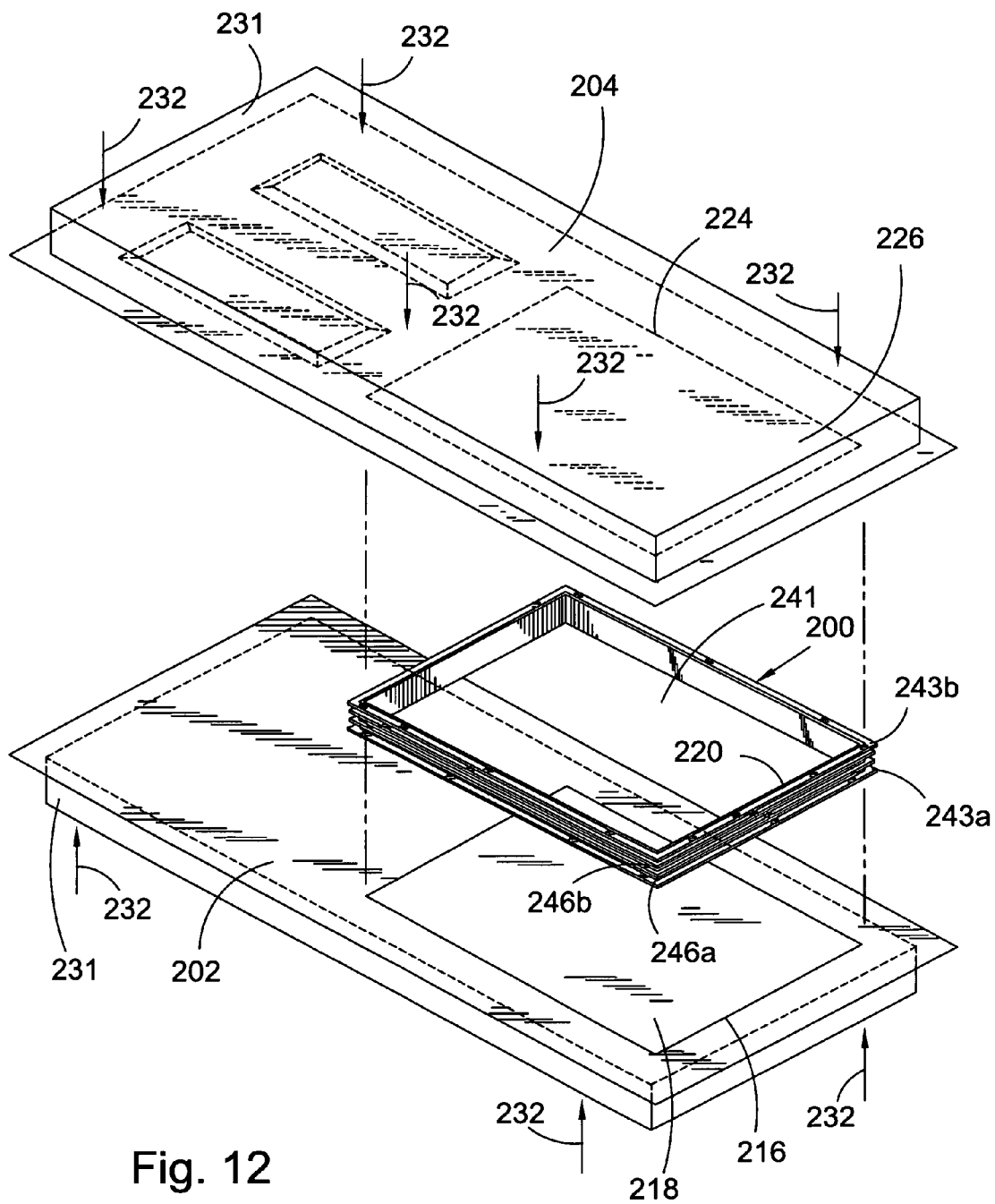
FIG. 12 is a perspective view of the door light insert of FIG. 11 shown during installation between first and second door skins.
Figure 13:
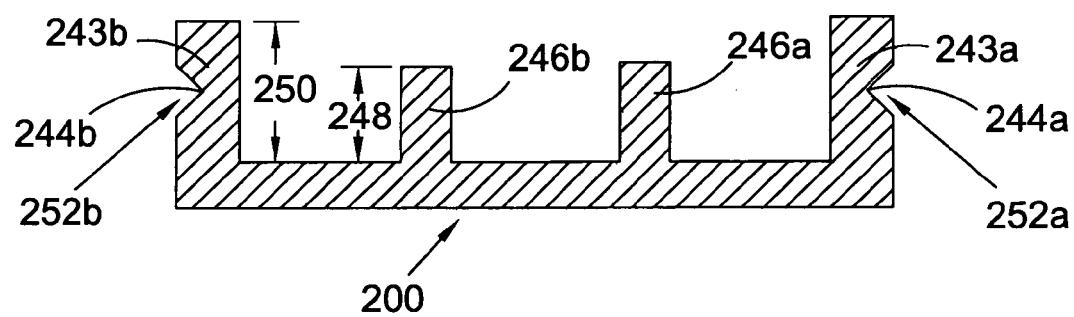
FIG. 13 is a cross sectional view of the door light insert of FIG. 11.
Figure 14:
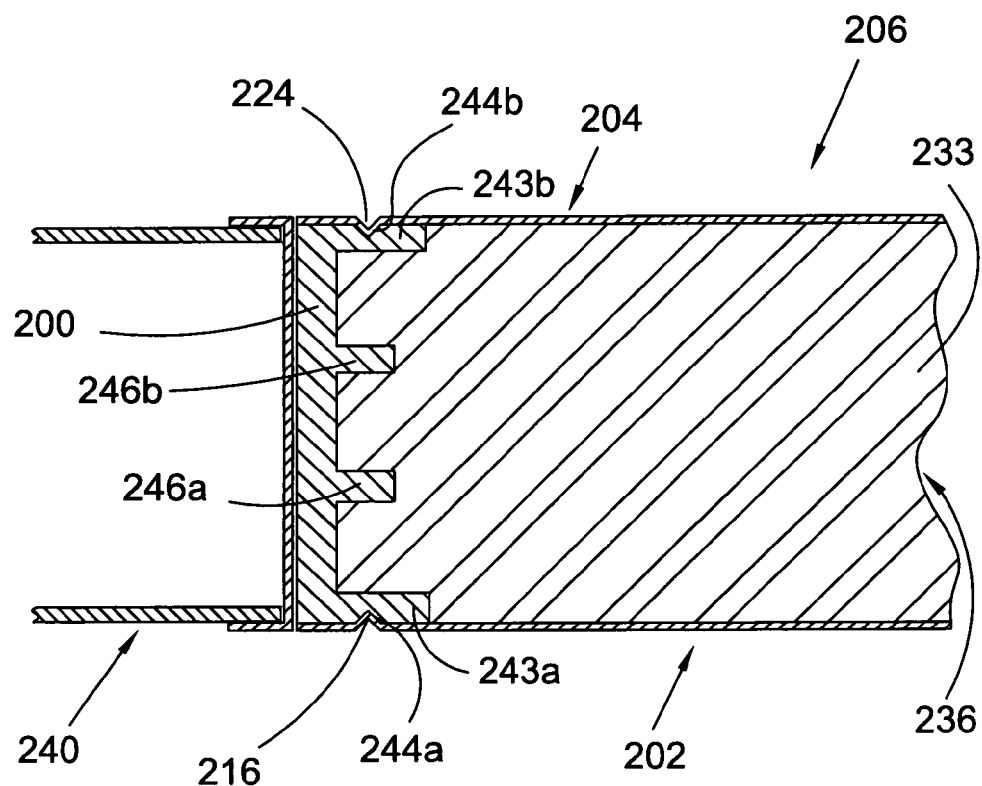
FIG. 14 is a cross sectional view of a completed door including the door light insert of FIG. 11 after fabrication.
Figure 15:
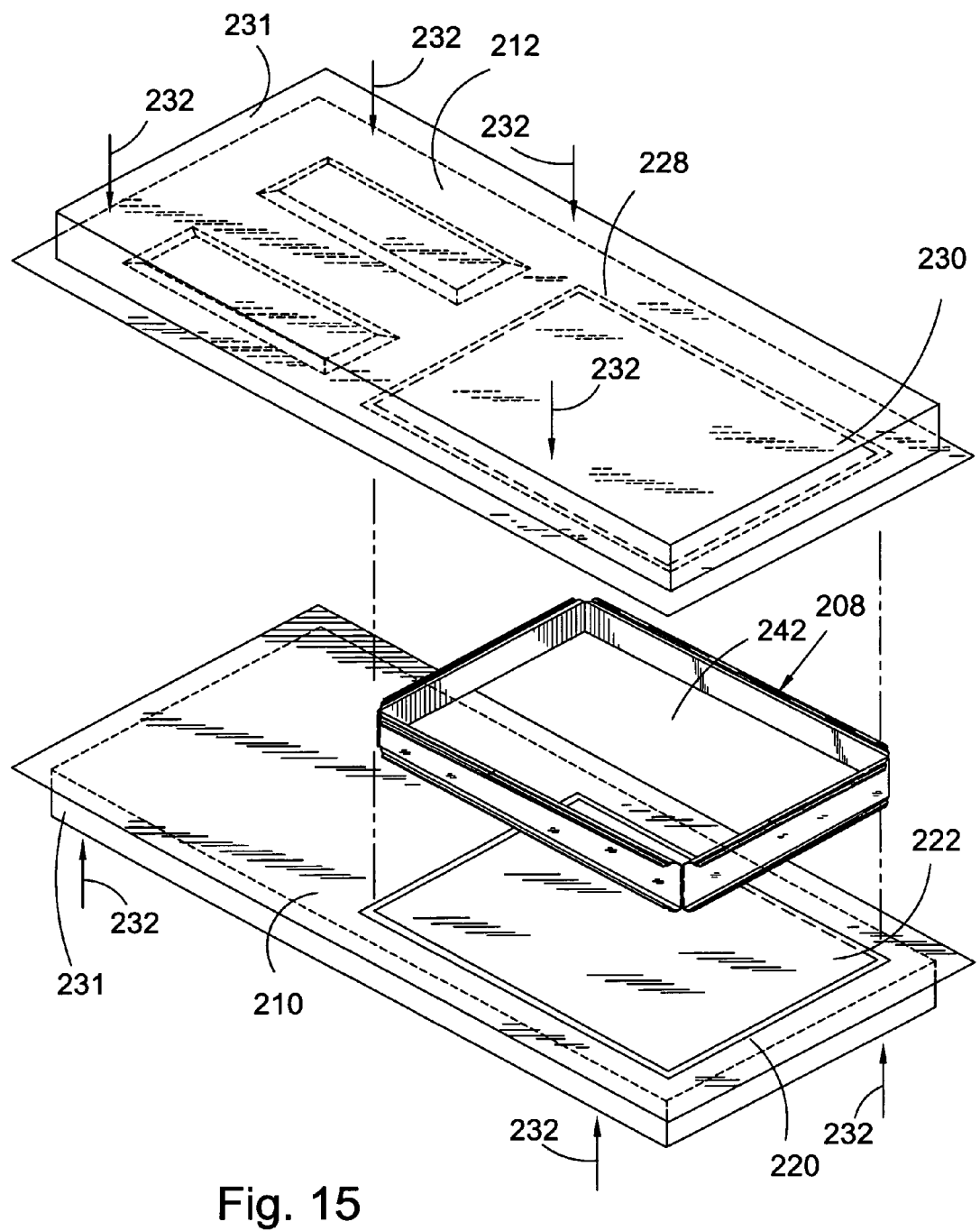
FIG. 15 is a perspective view of an embodiment of a present invention including a door light insert shown during installation between first and second door skins.
Figure 16:
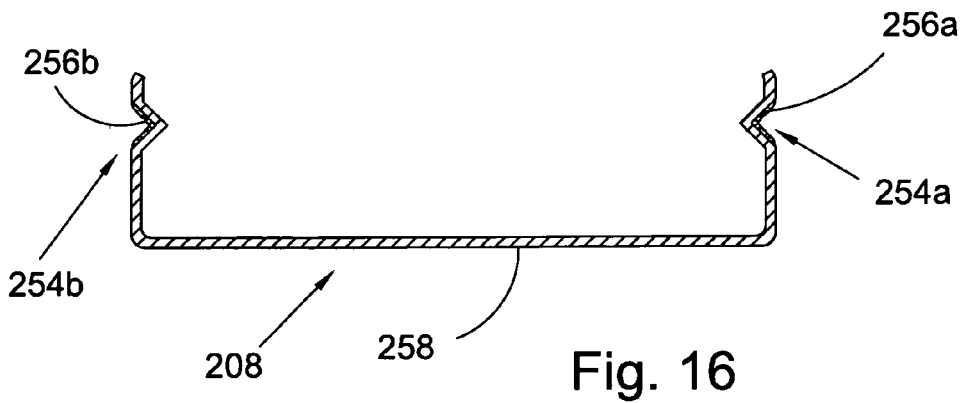
FIG. 16 is a cross sectional view of the door light insert of FIG. 15.
Figure 17:
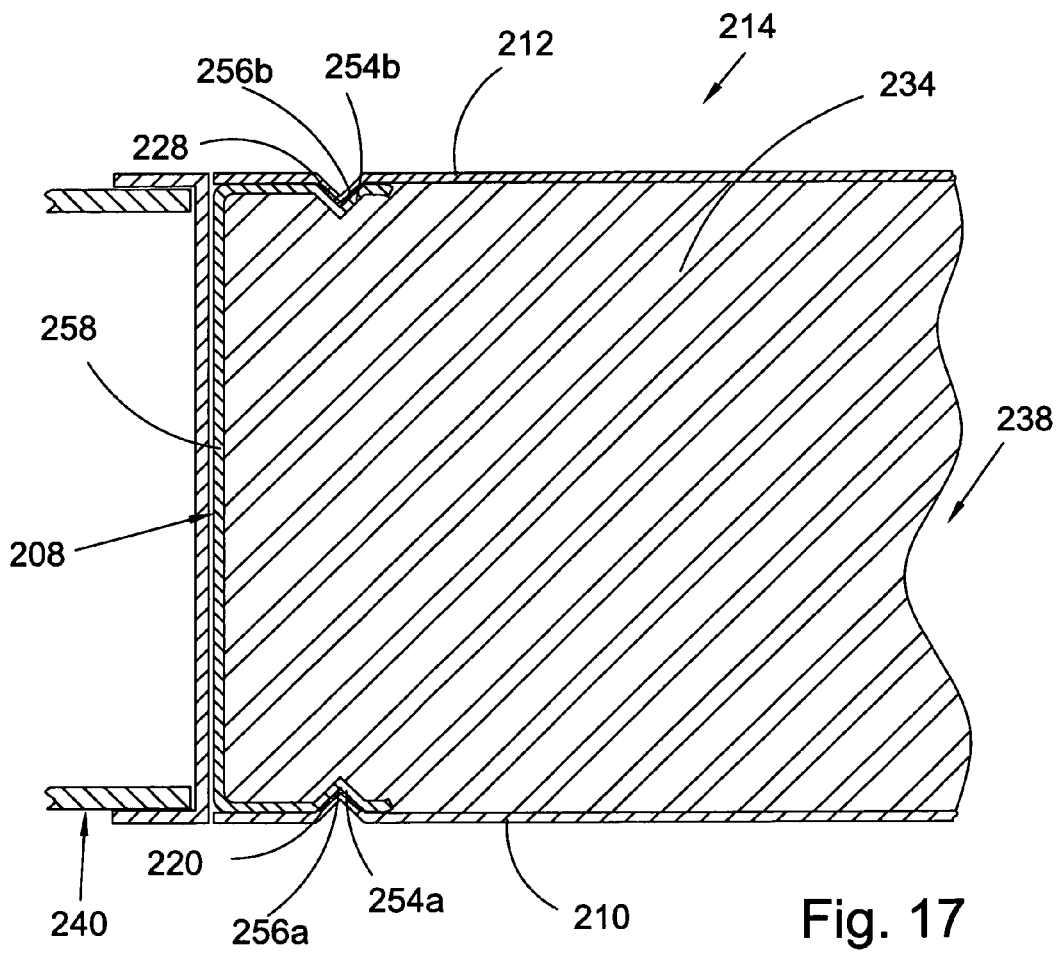
FIG. 17 is a cross sectional view of a completed door including the door light insert of FIG. 15 after fabrication.

FIG. 11 shows a perspective view of an embodiment of the present invention, i.e., door light insert 200, while FIG. 12 shows a perspective view of door light insert 200 during installation between first and second door skins 202 and 204, respectively. FIG. 13 shows a cross sectional view of door light insert 200, and FIG. 14 shows a cross sectional view of completed door 206 including door light insert 200 after fabrication. FIG. 15 shows a perspective view of an embodiment of a present invention including door light insert 208 shown during installation between first and second door skins 210 and 212, respectively. FIG. 16 shows a cross sectional view of door light insert 208, while FIG. 17 shows a cross sectional view of completed door 214 including door light insert 208 after fabrication. The following discussion is best understood in view of FIGS. 11 through 17.

It has been found that a door may be manufactured using a modified present invention insert, e.g., inserts 200 or 208, and a modified method of assembly as described herebelow. The modified method for fabricating a door having a window, begins with first and second door skins which do not include door light openings, e.g., first and second door skins 202 and 204, respectively, or first and second door skins 210 and 212, respectively. The method comprises the following steps in the order set forth herein. First, a door light opening perimeter is formed in each door skin, wherein each door light perimeter defines a portion. For example, first door skin 202 includes first door light opening perimeter 216 formed therein, and defining first portion 218; first door skin 210 includes first door light opening perimeter 220 formed therein, and defining first portion 222; second door skin 204 includes second door light opening perimeter 224 formed therein, and defining second portion 226; and, second door skin 212 includes second door light opening perimeter 228 formed therein, and defining second portion 230. Second, the first door skin, e.g., first door skin 202 or 210, is positioned on a first press, e.g., first press 231. Third, an insert, e.g., door light insert 200 or 208, is positioned in aligned registration with the first door light opening perimeter, e.g., first door light opening perimeter 216 or 220. Fourth, the second door skin, e.g., second door skin 204 or 212, is positioned over the insert, e.g., door light insert 200 or 208, wherein the second door light opening perimeter, e.g., second door light opening perimeter 224 or 228, is in aligned registration with the insert and the first door light opening perimeter. Fifth, the first press applies pressure, as shown by unidirectional arrows 232, to secure the first and second door skins with the insert. Sixth, a foam, e.g., foam 233 or 234, is injected into a first cavity formed between the first and second door skins and the insert, e.g., first cavity 236 or 238. Seventh, the first portion, e.g., first portion 218 or 222, and the second portion, e.g., second portion 226 or 230, are removed. In an embodiment, the method further comprises the eighth step of inserting a window, e.g., window 240, within a second cavity, e.g., second cavity 241 or 242, formed by the insert.

In the above described embodiment, the insert, e.g., insert 200, comprises pair of engagement flanges 243a and 243b for aligned registration and engagement with first and second door skins, e.g., door skins 202 and 204, each of engagement flanges 243a and 243b comprises a groove, e.g., groove 244a and 244b, respectively, arranged for receipt of one of first or second door light opening perimeters 216 and 224 therein. In an embodiment, the insert, e.g., insert 200, further comprises secondary pair of flanges 246a and 246b positioned substantially parallel and between pair of engagement flanges 243a and 243b. It should be appreciated that secondary pair of flanges 246a and 246b are encapsulated by foam, e.g., foam 233, within the cavity, e.g., cavity 236 formed between the first and second door skins and the insert, during the above described injection step. In an embodiment, secondary flanges 246a and 246b are equal in length but shorter in length than either of engagement flanges 243a and 243b. In other words, secondary flanges 246a and 246b comprise length 248, while engagement flanges 243a and 243b comprise length 250, and length 248 is less than length 250. It should be appreciated that other combinations of lengths and arrangements are also possible, e.g., the secondary flanges may be longer than the engagement flanges or the secondary flanges may be unequal in length relative to each other, and such variations are within the spirit and scope of the claimed invention.

In an embodiment, the grooves, e.g., grooves 244a and 244b, comprise a V-shaped cross-section, e.g., V-shaped sections 252a and 252b, respectively. Furthermore, in an embodiment, the insert, e.g., insert 200, is a molded plastic article. Moreover, in an embodiment, the insert, e.g., insert 208, is a metal article formed by a second press (not shown), e.g., a roll press, the insert comprises first and second bent portions, e.g., bent portions 254a and 254b, respectively. It should be appreciated that insert 208 is formed according to the method described above relative to insert 56. In an embodiment, the first and second bent portions are operatively arranged to matingly engage first and second door light opening perimeters, respectively, e.g., door light opening perimeters 220 and 228. Additionally, in an embodiment, the present invention broadly comprises a door, e.g., door 206 or 214, fabricated according to the method described supra.

In an embodiment, bonding agents 256a and 256b are deposited on bent portions 254a and 254b, respectively, as insert 208 exits the press, or are subsequently deposited as secondary operations after forming insert 208. Bonding agents 256a and 256b may for example be an adhesive, a pressure sensitive adhesive, a glue, an epoxy or a weld. Thus, during assembly, bent portion 254a having bonding agent 256a deposited thereon is pressed against first door light opening perimeter 220 of first door skin 210 thereby securing insert 208 to first door skin 210. Subsequently, second door light opening perimeter 228 of second door skin 212 is pressed against bent portion 254b, having bonding agent 256b deposited thereon, thereby securing second door skin 212 to insert 208. One of ordinary skill in the art recognizes that bonding agents 256a and 256b serve a variety of purposes which include but are not limited to: providing bonding strength to hold door skins 210 and 212 and insert 208 together during assembly and thereafter; and, providing a thermal break within the assembly to reduce heat transfer between door skins 210 and 212 and insert 208. Subsequent to assembling door skins 210 and 212 and insert 208, first cavity 238, i.e., the volume formed between first and second door skins 210 and 212, respectively, and wall 258 of insert 208, is filled with foam 234. As can be seen in the figures, wall 258 prevents any inflow of foam 234 within second cavity 242, i.e., the opening for a window.

One of ordinary skill in the art recognizes that although not described above, engagement flanges 243a and 243b of insert 200 may also have a bonding agent deposited thereon for purposes of assembly, and such variations are within the spirit and scope of the claimed invention. Additionally, one of ordinary skill in the art will recognize that all embodiments described herein may also be practiced without the presence of bonding agents, and such variations are also within the spirit and scope of the claimed invention.

Figure 18:
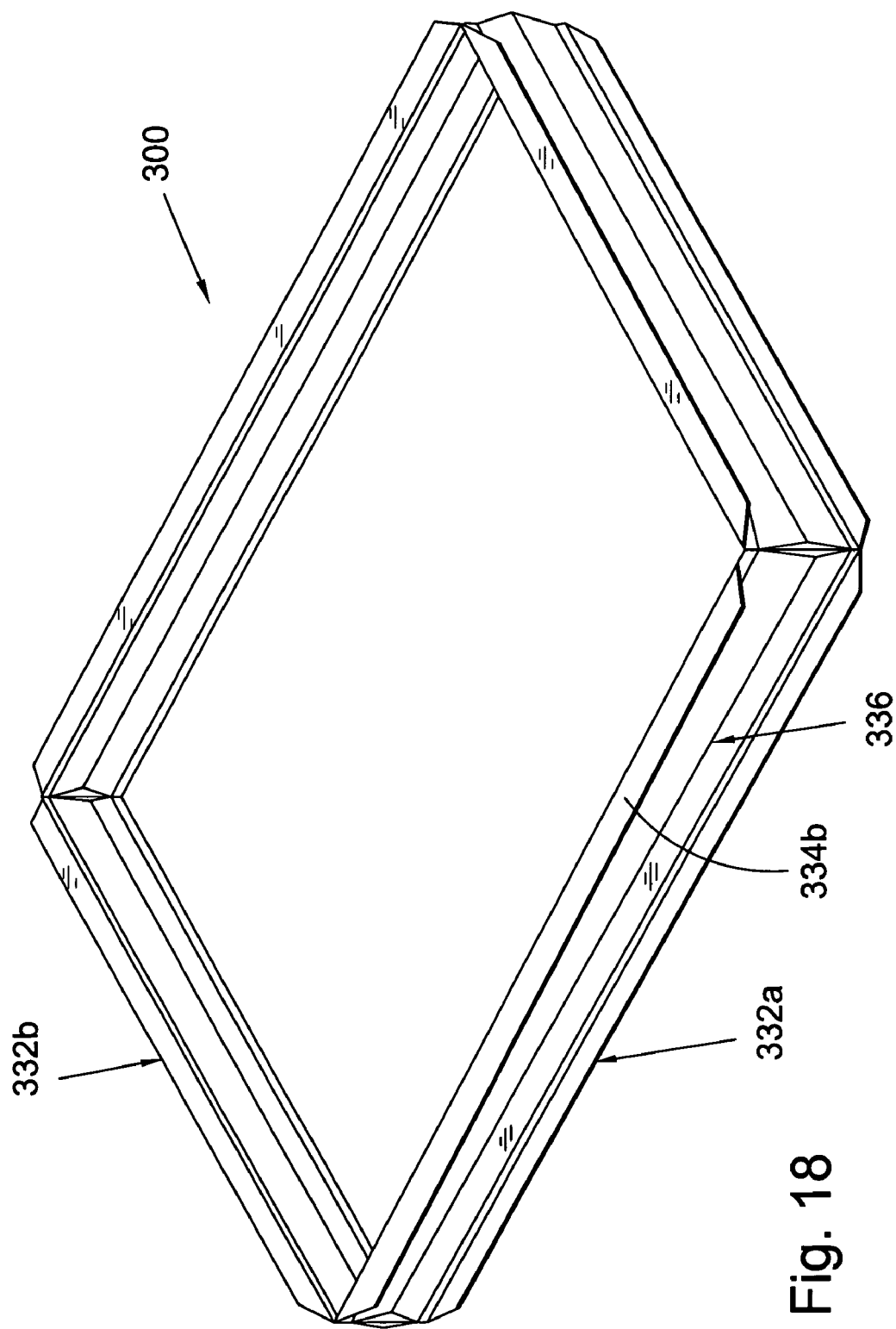
FIG. 18 is a perspective view of an embodiment of a present invention door light insert.
Figure 19:
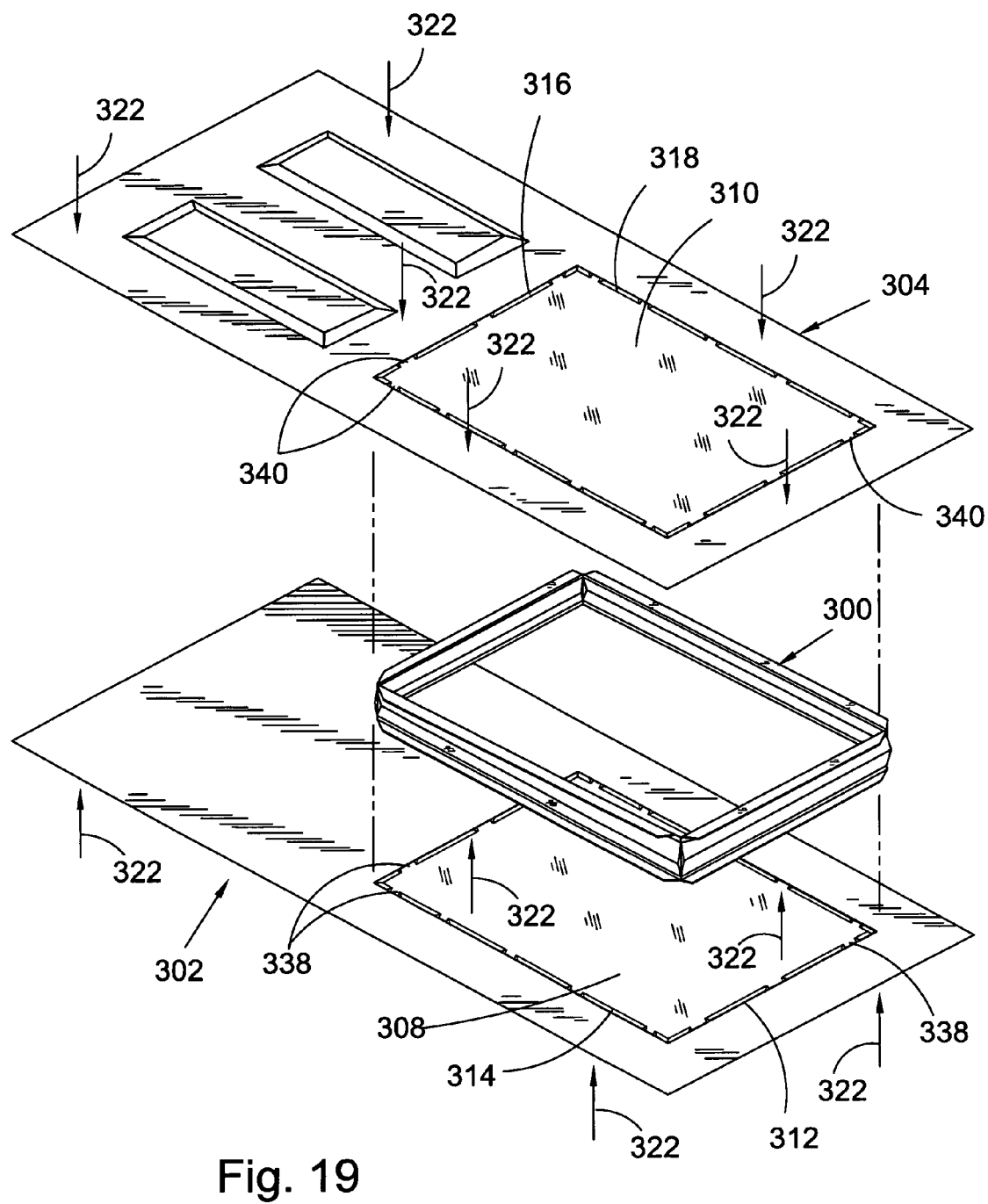
FIG. 19 is a perspective view of the door light insert of FIG. 18 shown during installation between first and second door skins.
Figures 20, 21:
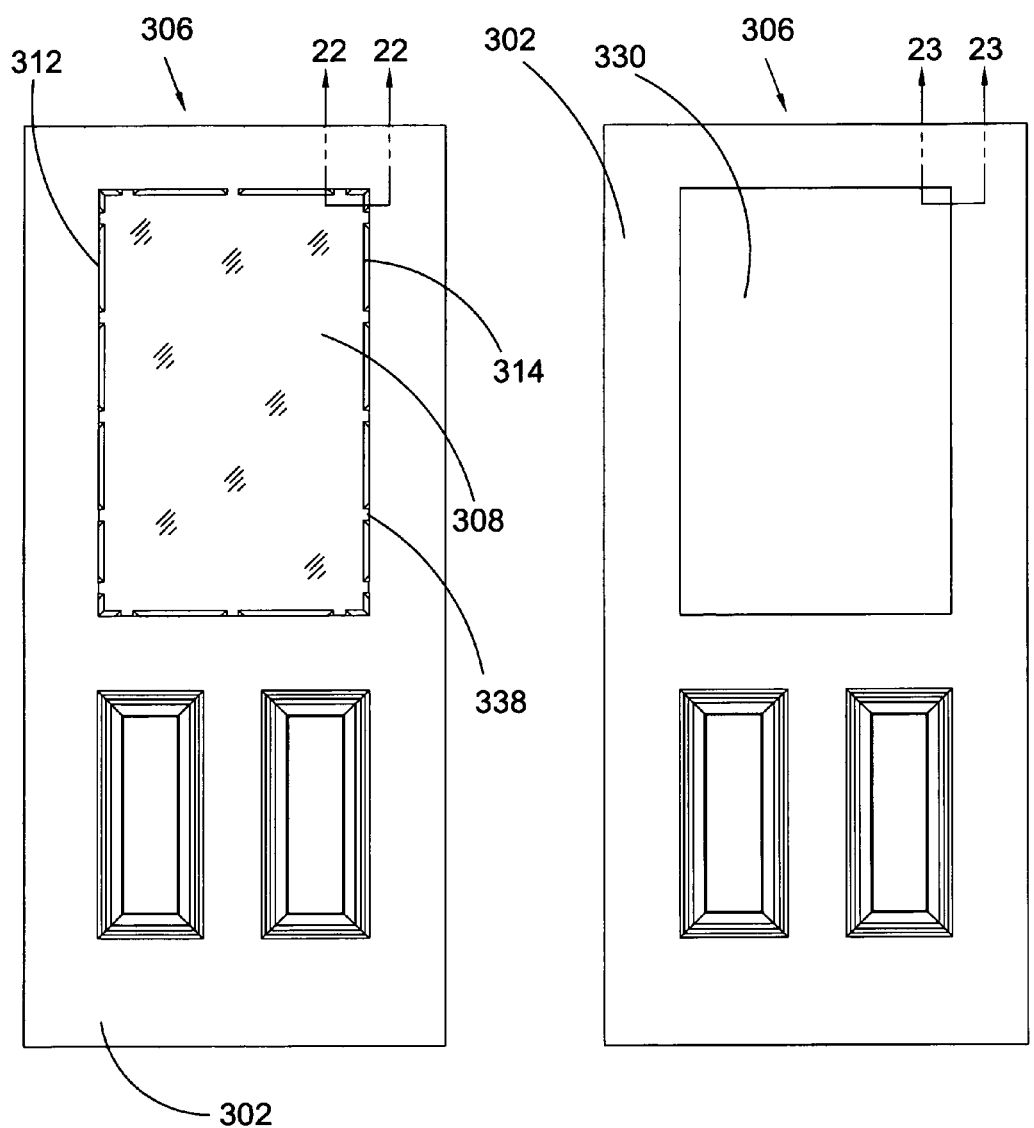
FIG. 20 is a front plan view of a door assembled according to the arrangement of FIG. 19 prior to removing first and second door light portions.
FIG. 21 is a front plan view of a door assembled according to the arrangement of FIG. 19 after removing first and second door light portions.
Figure 22:
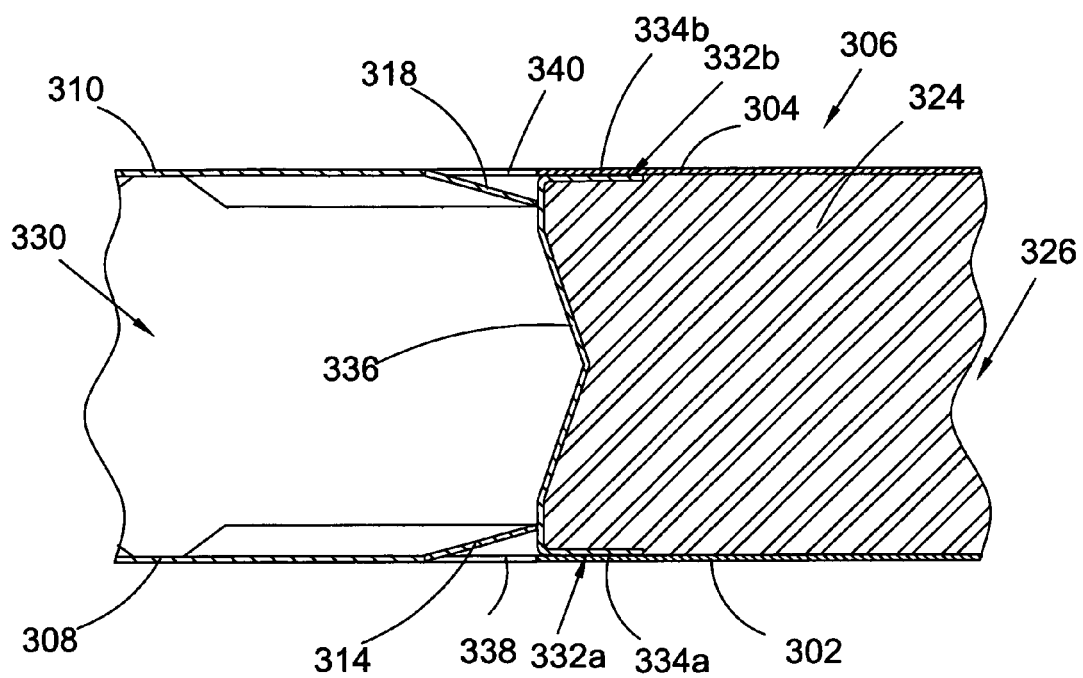
FIG. 22 is a cross sectional view taken generally along line 22-22 of FIG. 20.
Figure 23:
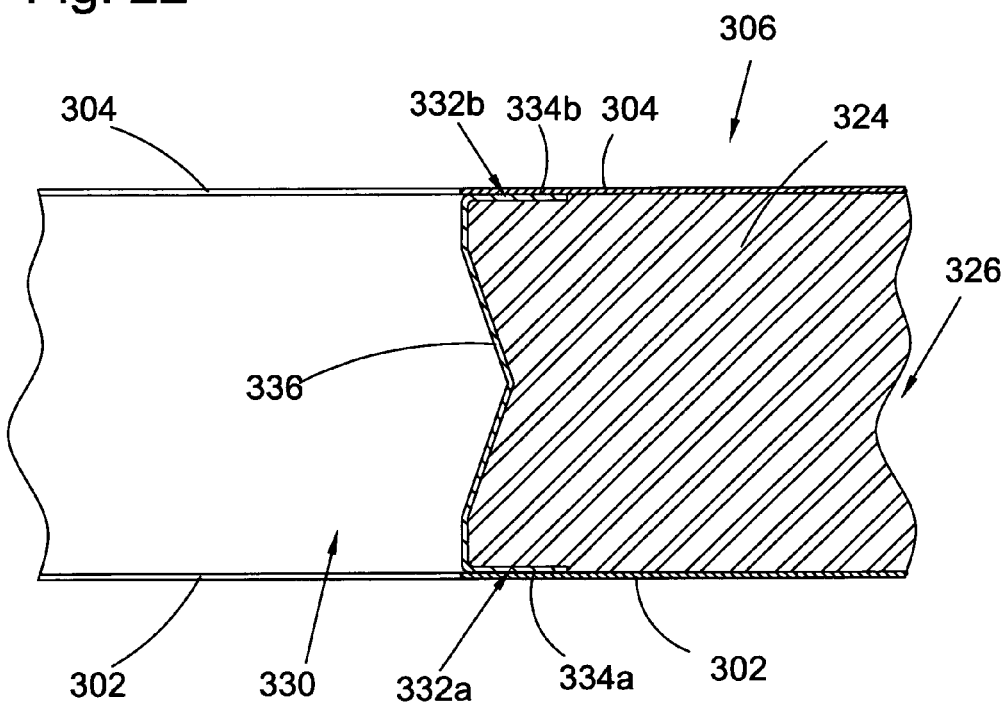
FIG. 23 is a cross sectional view taken generally along line 23-23 of FIG. 21; and, FIG. 24 is a cross sectional view of a door assembled according to the arrangement of FIG. 19 after removing first and second door light portions and inserting a window into the assembled door.
Figure 24:
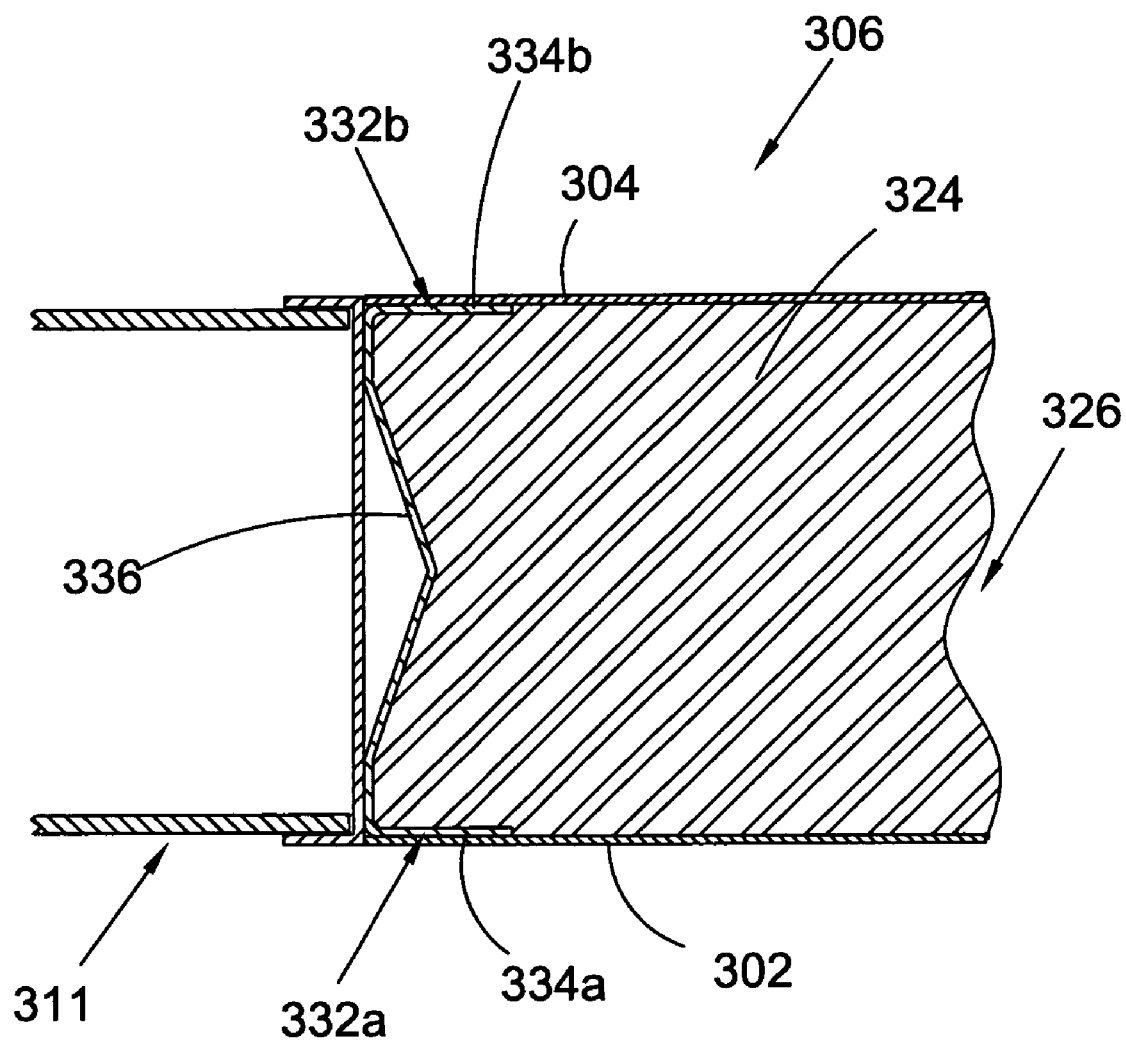

FIG. 18 shows a perspective view of an embodiment of a present invention door light insert, i.e., insert 300, while FIG. 19 shows a perspective view of door light insert 300 shown during installation between first and second door skins 302 and 304, respectively. FIG. 20 shows a front plan view of a door assembled according to the arrangement of FIG. 19, i.e., door 306, prior to removing first and second door light portions 308 and 310, respectively, while FIG. 21 shows a front plan view of door 306 after removing first and second door light portions 308 and 310, respectively. FIG. 22 shows a cross sectional view taken generally along line 22-22 of FIG. 20 and FIG. 23 shows a cross sectional view taken generally along line 23-23 of FIG. 21. FIG. 24 shows a cross sectional view of door 306 after removing first and second door light portions 308 and 310, respectively, and inserting window 311 is inserted into door 306. The following discussion is best understood in view of FIGS. 18 through 24.

It has also been found that a door, e.g., door 306, may be manufactured using a further modified present invention insert, e.g., insert 300, and a further modified method of assembly, as described herebelow. The further modified method for fabricating a door having a window, begins with first door skin 302 and second door skin 304. Again, this embodiment of the method begins with first door skin 302 including first door light portion 308 and second door skin 304 including second door light portion 310 and first and second door light portions 308 and 310, respectively, have not been removed. The method comprises the following steps in the order set forth herein. First, a first door light opening perimeter is formed, e.g., first door light opening perimeter 312. The first door light opening perimeter comprises a first plurality of tabs, e.g., tabs 314, arranged about the first door light opening perimeter, wherein the first door light opening perimeter defines a first door light portion, e.g., first door light portion 308. Next, a second door light opening perimeter is formed, e.g., second door light opening perimeter 316. The second door light opening perimeter comprises a second plurality of tabs, e.g., tabs 318, arranged about the second door light opening perimeter, wherein the second door light opening perimeter defines a second door light portion, e.g., second door light portion 310. Then, the first door skin, e.g., first door skin 302, is positioned on a first press, e.g., first press 320. Next, an insert, e.g., insert 300, is positioned in aligned registration with the first plurality of tabs, e.g., tabs 314. It should be appreciated that by positioning insert 300 in aligned registration with the first plurality of tabs, insert 300 is also positioned in aligned registration with the first door light opening perimeter, e.g., first door light opening perimeter 312. Next, the second door skin, e.g., second door skin 304, is positioned over the insert, e.g., insert 300, wherein the second plurality of tabs, e.g., tabs 318, are in aligned registration with the insert, and thus the first and second door light opening perimeters are aligned. Additionally, it should be appreciated that by positioning the second plurality of tabs in aligned registration with insert 300, insert 300 is also positioned in aligned registration with the second door light opening perimeter, e.g., second door light opening perimeter 316. Then, the first press applies pressure, as shown by unidirectional arrows 322, to secure the first and second door skins with the insert. Next, a foam, e.g., foam 324, is injected into a first cavity formed between the first door skin outside the first door light portion, the second door skin outside the second door light portion and the insert, e.g., first cavity 326. Lastly, the first and second door light portions, e.g., first and second door light portions 308 and 310, respectively, are removed. In an embodiment, the modified method further comprises the additional step of inserting a window, e.g., window 311, within a second cavity, e.g., second cavity 330, formed by the insert.

In the above described method, the insert, e.g., insert 300, comprises a pair of sealing flanges, e.g., sealing flanges 332a and 332b, arranged to provide seals about first and second door light opening perimeters 312 and 316, respectively. Each of sealing flanges 332a and 332b comprises a substantially planar surface, e.g., planar surfaces 334a and 334b, arranged for engagement with first and second door skins 302 and 304. Insert 300 further comprises connection portion 336. Connection portion 336 is integral to and between sealing flanges 332a and 332b. Connection portion 336 is engaged by foam 324 within first cavity 326 during the injection step. In the embodiment shown in the figures, connection portion 336 is substantially V-shaped. Thus, pair of sealing flanges 332a and 332b in combination with connection portion 336 is substantially W-shaped. One of ordinary skill in the art will recognize that although sealing flanges 332a and 332b are shown to be substantially planar surfaces, other configurations are also possible, e.g., curved surfaces or V-shaped grooves, and such variations are within the spirit and scope of the claimed inventions. It should be appreciated that with such variations complimentary mating features will also be present proximate the door light opening perimeters, e.g., curved surfaces or V-shaped grooves.

It should be appreciated that insert 300 may be constructed from a variety of materials. For example, insert 300 may be a molded plastic article, or insert 300 may be a metal article formed by a press, e.g., a roller press. As described above, such inserts comprise a pair of sealing flanges, e.g., sealing flanges 332a and 332b, and a connection portion, e.g., connection portion 336, integral to and between the pair of sealing flanges. Similarly, the sealing flanges are operatively arranged to provide seals about the first and second door light opening perimeters, e.g., first and second door light opening perimeters 312 and 316, respectively.

It should also be appreciated that the present invention broadly comprises a door, e.g., door 306, fabricated according to the method described supra.

In view of the foregoing, a present invention door, i.e., door 306, comprises a first door skin, e.g., first door skin 302. The first door skin comprises a first door light opening perimeter, e.g., first door light opening perimeter 312. The first door light opening perimeter comprises a first plurality of tabs arranged about the first door light opening perimeter, e.g., first plurality of tabs 314. Additionally, the present invention door comprises a second door skin, e.g., second door skin 304. The second door skin comprises a second door light opening perimeter, e.g., second door light opening perimeter 316. The second door light opening perimeter comprises a second plurality of tabs arranged about the second door light opening perimeter, e.g., second plurality of tabs 318. Thus, the present invention door comprises oppositely disposed first and second door skins which are arranged to form a first cavity therebetween, e.g., first cavity 326. It should be appreciated that the above described arrangement results in the first and second door light opening perimeters being in registered alignment. The present invention door further comprises an insert, e.g., insert 300. The insert comprises a pair of sealing flanges, e.g., sealing flanges 332a and 332b, and a connection portion integral to and between the pair of sealing flanges, e.g., connection portion 336. The sealing flanges are arranged to provide seals about the first and second door light opening perimeters. Each of the pair of sealing flanges comprises a substantially planar surface, e.g., planar surfaces 334a and 334b, arranged for engagement with the first and second door skins to close the first cavity between the first and second door skins to prevent an infill of a foam, e.g., foam 324, into a second cavity, e.g., second cavity 330, during fabrication of the present invention door. The second cavity is defined by the first and second door light opening perimeters and said insert.

In the embodiment shown in the figures, the first door light opening perimeter further comprises a first plurality of breakaway connectors, e.g., first plurality of breakaway connectors 338, arranged to permit the removal of a first area of said first door skin within said first door light opening perimeter, e.g., first door light portion 308. Similarly, the second door light opening perimeter further comprises a second plurality of breakaway connectors, e.g., second plurality of breakaway connectors 340, arranged to permit the removal of a second area of said second door skin within said second door light opening perimeter, e.g., second door light portion 310. It should be appreciated that the side or sides of each tab 314 proximate first door light opening perimeter 312 is cut during the tab forming step, and then bent towards the cavity formed between the door skins. Contrarily, the portion of material which makes up each breakaway connector 338 remains connected to first door light opening perimeter 312. Thus, subsequent to tab formation, first door light portion 308 is held to first door skin 302 by only breakaway connectors 338. Similarly, the side or sides of each tab 318 proximate second door light opening perimeter 316 is cut during the tab forming step, and then bent towards the cavity formed between the door skins. Contrarily, the portion of material which makes up each breakaway connector 340 remains connected to second door light opening perimeter 316. Thus, subsequent to tab formation, second door light portion 310 is held to second door skin 304 by only breakaway connectors 340.

Quite unexpectedly, it has been found that doors constructed according to the present invention method, i.e., doors which include the present invention door light insert, attain improved strength and rigidity, e.g., during hurricane strength testing. Additionally, as there is no foam within the inner cavity created by the first and second door skins and the insert, as the first and second door light portions are removed, such portions may be recycled and used for the manufacture of more door skins. Contrarily, as described supra, if foam were allowed to enter the inner cavity, the removal of the first and second door light portions would produce a hazardous waste which must be disposed of according to the local laws where the door is manufactured. In other words, merely having the first and second door light portions bound together by foam therebetween converts the first and second door light portions to hazardous waste.

One of ordinary skill in the art will recognize several additional aspects of the present invention, which aspects are within the spirit and scope of the claimed invention. For example, the door skins may also include decorative portions, e.g., embossments, and these portions may be formed during the same stamping operation as the door light openings are formed, or as a prior or subsequent operation. Additionally, the door skins may have decorative portions secured thereto, e.g., raised decorative embellishments. It should also be appreciated that a present invention insert may be sold individually, in combination with door skins or as a part of a completed door having a door light opening and/or a window installed therein. In like fashion, it should be appreciated that, although the present invention inserts described supra have rectangular or square shaped openings, other shapes are also possible, e.g., circular, hemispherical, triangular, polygon or octagon, and such variations are within the spirit and scope of the claimed invention. Additionally, although in the embodiments shown in the figures and described above include grooves and bent portions having V-shaped or arcuate cross sections, other shapes are also possible, e.g., square, rectangular, polygon, etc., and such variations are within the spirit and scope of the claimed invention.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A method for fabricating a door having a window, said door comprising a first door skin and a second door skin, said method comprising the following steps in the order named:

a) forming a first door light opening perimeter comprising a first plurality of tabs arranged about said first door light opening perimeter, wherein said first door light opening perimeter defines a first door light portion;
   b) forming a second door light opening perimeter comprising a second plurality of tabs arranged about said second door light opening perimeter, wherein said second door light opening perimeter defines a second door light portion;
   c) positioning said first door skin on a first press;
   d) positioning an insert in aligned registration with said first plurality of tabs;
   e) positioning said second door skin over said insert, wherein said second plurality of tabs are in aligned registration with said insert, and said first door light opening perimeter is aligned with said second door light opening perimeter;
   f) applying pressure with said first press to secure said first and second door skins with said insert;
   g) injecting a foam into a first cavity formed between said first door skin outside said first door light portion, said second door skin outside said second door light portion and said insert; and,
   h) removing said first and second door light portions.

2. The method of claim 1 further comprising the step of:
   i) inserting said window within a second cavity formed by said insert.

3. The method of claim 1, wherein said insert comprises a pair of sealing flanges arranged to provide seals about said first and second door light opening perimeters, each of said pair of sealing flanges comprises a substantially planar surface arranged for engagement with said first and second door skins.

4. The method of claim 3, wherein said insert further comprises a connection portion integral to and between said pair of sealing flanges, said connection portion engaged by said foam within said cavity during said injection step.

5. The method of claim 4, wherein said connection portion is substantially V-shaped.

6. The method of claim 5, wherein said pair of sealing flanges and said connection portion are substantially W-shaped.

7. The method of claim 1, wherein said insert is a molded plastic article.

8. The method of claim 1, wherein said insert is a metal article formed by a second press, said insert comprising a pair of sealing flanges and a connection portion integral to and between said pair of sealing flanges.

9. The method of claim 8, wherein said pair of sealing flanges are operatively arranged to provide seals about said first and second door light opening perimeters.

* * * * *